UNITED STATES PATENT OFFICE.

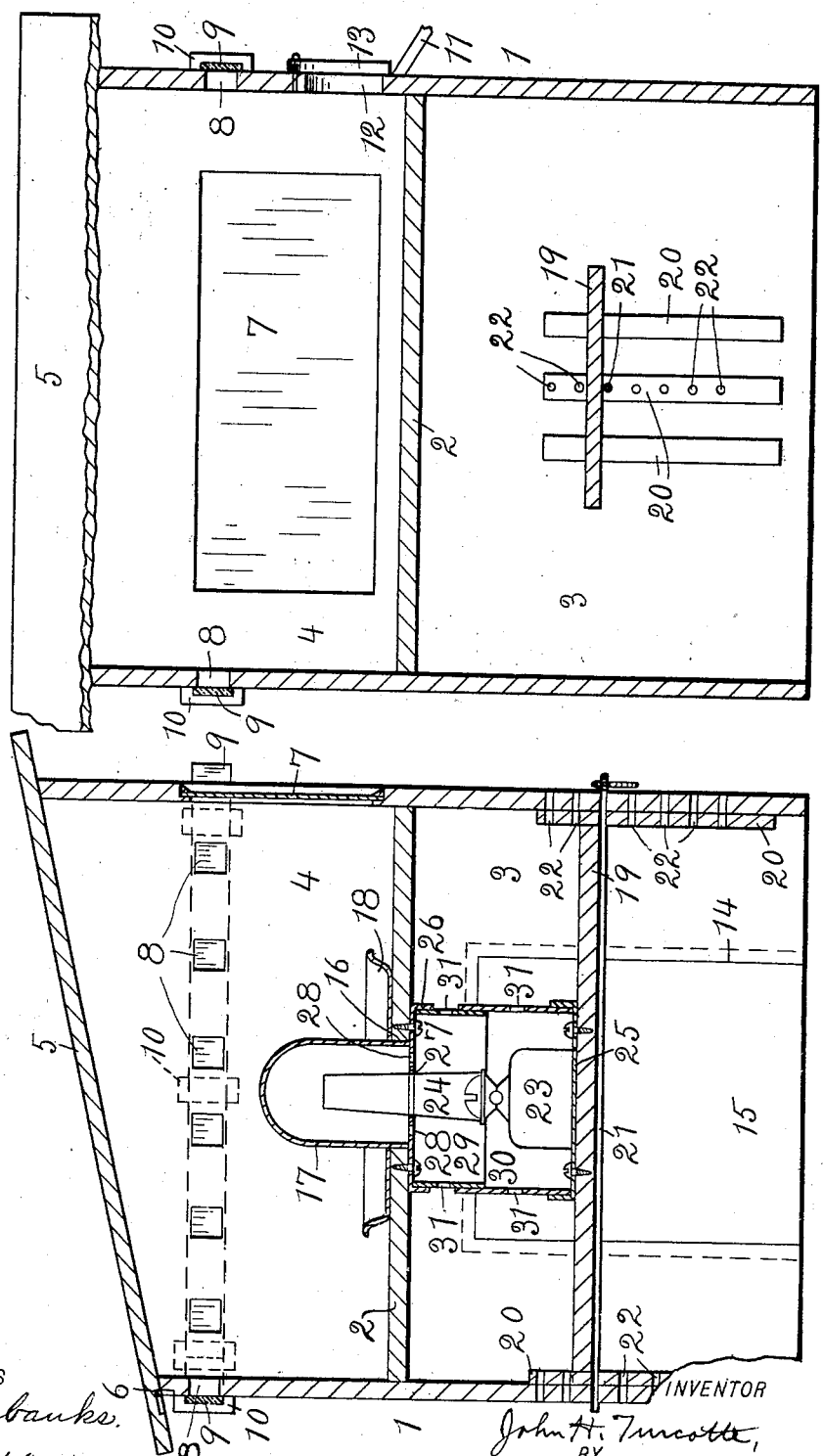

JOHN H. TURCOTTE, OF SPRINGFIELD, MASSACHUSETTS.

BROODER OR INCUBATOR.

No. 891,644.     Specification of Letters Patent.     Patented June 23, 1908.

Application filed January 27, 1908. Serial No. 412,751.

*To all whom it may concern:*

Be it known that I, JOHN H. TURCOTTE, a subject of the King of Great Britain, residing at Springfield, in the county of Hampden and State of Massachusetts, have invented a new and useful Brooder or Incubator, of which the following is a specification.

My invention relates to improvements in devices employed in poultry raising, in which I provide a box, casing, or housing divided into upper and lower compartments and having certain peculiar heating and ventilating appliances, all as hereinafter set forth.

The objects of my invention are, first, to provide a brooder having a chicken chamber which is well lighted, adequately heated, and can be ventilated thoroughly without undue exposure of the chickens therein; second, to afford means for warming the feed for the chickens with the same medium which is employed to heat the chicken chamber; third, to furnish such a brooder with adjustable supporting and protecting means for a lamp to the end that almost any ordinary style of lamp can be used for heating purposes, and, fourth, to provide a comparatively simple and inexpensive brooder which is easy to operate and take care of and is withal practicable and efficient.

Although this device is particularly well adapted for brooder purposes, it may be employed in the capacity of an incubator by placing suitable egg trays or racks in the upper chamber, the heating appliance being capable of furnishing sufficient heat to hatch eggs as well as of maintaining the proper temperature for chickens.

I attain these objects by the means illustrated in the accompanying drawings, in which—

Figure 1 is a central vertical section through a brooder embodying a practical form of my invention, looking toward the right-hand end, and, Fig. 2, a vertical section through such brooder taken between the heating appliance and the front wall and looking toward said wall.

Similar figures refer to similar parts throughout the several views.

As shown in the drawings, I provide a housing or box 1 divided by a horizontal diaphragm or floor 2 into a lamp compartment or chamber 3 below and a brooder or chicken compartment or chamber 4 above.

The bottom of the chamber 3 may be open or not as desired, but the top of the chamber 4 is closed by means of a cover 5 hinged at 6 to the top of the rear wall of the box 1. This cover, which is the roof of the brooder, projects beyond each wall of the box so as to afford some protection from the sun and from rain or snow. In the front wall of the chamber 4 is a comparatively large window 7, and in the back and end walls of said chamber some distance above the floor 2 are ventilator openings 8 which may be closed by means of slides 9 arranged in brackets 10 on the outside of said back and end walls. The slides 9 should be made of glass or other transparent or translucent material in order that an abundance of light may be permitted to enter the chamber 4 when the ventilator openings are closed as well as when they are open. By thus making ample provision for light and air chickens raised in the brooder are kept always in a healthy condition.

A run-way from the chamber 4 may be provided, the upper part of such a run-way being shown at 11, in Fig. 2. Leading to this run-way is an opening 12 through which the chickens may pass in leaving and entering the chamber 4. A swinging door 13 is provided for the opening 12.

In the end wall of the box 1 opposite that in which the opening 12 is located, but below the floor 2, is an opening 14 into the lamp chamber 3, which opening 14 is closed by means of a suitable door 15.

Seated at its base in a central opening 16 in the floor 2 is a drum 17 which rises above said floor into the chamber 4. This drum is closed at the top and partly open at the bottom and is the direct heating medium for the chamber 4, since it is the member which radiates the heat from the lamp below, presently to be described. The top of the drum 17 is rounded so that in case a chicken succeeds in getting onto the same it will immediately slide off and thus be saved from getting burned. A pan 18 having a central opening therein to admit the drum 17 is placed on the floor 2 around said drum, and this pan is designed to receive and hold food for the chickens, which food is kept warm owing to the close proximity of the heated drum to the pan and its contents. This is an important feature for the reason that the food for young chickens should be warm in order to obtain the best results with them.

For the purpose of enabling me to use an ordinary lamp as a heating medium for my brooder, I provide an adjustable support for the lamp, also an adjustable guard or protector for the lamp, both of which are described below.

The adjustable support for the lamp consists of a cross-piece 19 having its ends arranged in sliding relation to and guided by vertical cleats 20 fastened against the inside of the front and rear walls of the chamber 3, together with a rod 21 adapted to be inserted in any two horizontal alining holes 22 to support said cross-piece thereon, there being a plurality of said holes 22 in the aforesaid front and rear walls which holes extend through the two middle cleats 20. The arrangement and construction of parts just described permit lamps and chimneys of different heights to be used, and also render the placing in and removal from position of the lamp easy and convenient. A lamp is represented at 23 the chimney 24 of which extends upward into the drum 17.

A cup 25, for the lamp 23, is fastened on top of the cross-piece 19 at the center, and a flanged plate or collar 26 is fastened against the underside of the floor 2 directly above said cup. There is an opening 27 in the middle of the collar 26 for the passage of the lamp chimney 24, and around said opening in that portion of said collar which forms the floor of the drum 17 there are a number of perforations or holes 28 to permit the gas and smoke emanating from the lamp 23 to escape from said drum. The members 25 and 26 together with two telescoping hollow cylinders 29 and 30 which fit into said members 25 and 26, surround and inclose the lamp and constitute a guard or protector therefor. Openings 31 are made in the cylinders 29 and 30 to admit air to the lamp burner. All of these telescoping members, that is, the cup 25, the collar 26, and the cylinders 29 and 30 are preferably made of sheet-metal. The telescopic connections between the cylinders themselves and between them and their supporting members at the top and bottom allow the cylinders to be adjusted so as to lengthen or shorten the space within for the lamp, and also allow the parts to be separated when it is desired to remove the lamp from the chamber 3.

In practice, while the rod 21 is out and the cross-piece 19 down near the bottom of the chamber 3, introduce the lamp 23 through the opening 14 into said chamber and place it in the cup 25, place the cylinders 29 and 30 over said lamp with the base of the cylinder 30 in said cup, raise said cross-piece until the lamp is situated at the proper height and then secure the cross-piece with said rod by inserting the latter in the alining holes 22 which are immediately below the bottom plane of the cross-piece, and finally elevate the cylinder 29 into engagement with the collar 26 if it is not already in such position. The heat from the lamp, which latter should have been lighted before being placed in the chamber 3, is concentrated in the drum 17 from which it radiates into the chamber 4. The construction is such that little or no heat escapes from the lamp except into the drum, hence the flame of the lamp can be turned quite low in most instances. It is thus seen that the apparatus is both safe and economical, and that there is no chance of any smoke, gas, or odor from the lamp getting into the chamber 4.

To remove the lamp for filling or other purposes, withdraw the rod 21 and depress the cross-piece 19, meanwhile separating the telescoping members.

One or more of the slides 9 is or are drawn out and pushed in to open and close partially or wholly one or more of the openings 8 from time to time a may be required to thoroughly ventilate said chamber and assist in maintaining the proper temperature therein.

The feed-pan 18 can be quickly removed for the purpose of cleaning, or for any other purpose, at any time, when the cover or lid 5 is raised, by simply lifting said pan over the drum, and it can be replaced as quickly.

Various changes of minor importance may be made in my invention without departing from the nature thereof, as will readily occur to one skilled in the art.

What I claim as my invention, and desire to secure by Letters Patent, is—

1. The combination, in a device of the class described, of the walls of a chamber having ventilator openings in one or more of such walls, such openings being arranged in a row, and an imperforate member for said row to open and close said openings, said member being capable of admitting light while excluding air when positioned to close the openings.

2. The combination, in a device of the class described, of a housing, a diaphragm dividing said housing into upper and lower compartments, a drum closed at the top in said upper compartment, a collar at the base of said drum perforated to receive a lamp chimney and to permit the products of combustion to escape from the bottom of the drum, a vertically-movable supporting member in said lower compartment, a lamp on said member, and a chimney on said lamp extending through said collar into such drum.

3. The combination, in a device of the class described, of a housing, a diaphragm dividing said housing into upper and lower compartments, the walls of said lower compartment having perforations therein, a drum in said upper compartment, a collar at the base of said drum to partially close said base, a vertically-movable cross-piece in the lower compartment, a lamp on said cross-piece, a chimney on said lamp extending through said collar into such drum, the diaphragm having an opening therein to accommodate said chimney, and a rod capable of being inserted in the aforesaid perforations to support said cross-piece.

4. The combination, in a device of the class described, of a housing, a diaphragm dividing said housing into upper and lower compartments, a drum having a closed top in said upper compartment, an annular feed-pan in said upper compartment around said drum, and a lamp and chimney suitably supported in the lower compartment with the chimney extending into the drum to heat the latter and said feed-pan, the diaphragm having an opening therein to accommodate said chimney.

5. The combination, in a device of the class described, of a housing, a diaphragm dividing said housing into upper and lower compartments, a drum having a closed top in said upper compartment, a collar at the base of such drum perforated to receive a lamp chimney and to permit the products of combustion to escape from the bottom of the drum, a vertically-movable supporting member in said lower compartment, a lamp on said member, a chimney on said lamp extending through said collar into the drum, the diaphragm having an opening therein to accommodate said chimney, and a telescopic guard for the lamp between said diaphragm and said supporting member, said guard having perforations therein also for the escape of the products of combustion from the drum.

JOHN H. TURCOTTE.

Witnesses:
  F. A. CUTTER,
  A. C. FAIRBANKS.